US012609648B2

(12) United States Patent
Braford, Jr.

(10) Patent No.: US 12,609,648 B2
(45) Date of Patent: Apr. 21, 2026

(54) SYSTEM AND METHOD FOR THERMAL AND LUBRICATION MANAGEMENT IN ELECTRIC DRIVE MODULE

(71) Applicant: FCA US LLC, Auburn Hills, MI (US)

(72) Inventor: Thomas E Braford, Jr., Brighton, MI (US)

(73) Assignee: FCA US LLC, Auburn Hills, MI (US)

( * ) Notice: Subject to any disclaimer, the term of this patent is extended or adjusted under 35 U.S.C. 154(b) by 151 days.

(21) Appl. No.: 18/426,405

(22) Filed: Jan. 30, 2024

(65) Prior Publication Data

US 2025/0247037 A1     Jul. 31, 2025

(51) Int. Cl.
| | |
|---|---|
| *H02P 29/60* | (2016.01) |
| *B60K 11/02* | (2006.01) |
| *H02K 7/116* | (2006.01) |
| *H02K 9/193* | (2006.01) |
| *H02K 11/25* | (2016.01) |

(52) U.S. Cl.
CPC .............. *H02P 29/60* (2016.02); *B60K 11/02* (2013.01); *H02K 7/116* (2013.01); *H02K 9/193* (2013.01); *H02K 11/25* (2016.01)

(58) Field of Classification Search
CPC ......... H02P 29/60; H02K 11/25; H02K 7/116; H02K 9/193; B60K 11/02
See application file for complete search history.

(56) References Cited

U.S. PATENT DOCUMENTS

| | | | | |
|---|---|---|---|---|
| 11,456,497 B2 * | 9/2022 | Mackenzie | ......... | H01M 10/625 |
| 11,808,345 B2 | 11/2023 | Miyamoto | | |
| 2014/0190428 A1 * | 7/2014 | Kikuchi | ................. | F01M 5/005 |
| | | | | 123/41.55 |
| 2015/0128584 A1 * | 5/2015 | Zaleski | ..................... | F02N 9/04 |
| | | | | 60/459 |
| 2023/0167887 A1 * | 6/2023 | Lee | ......................... | F16H 45/02 |
| 2024/0190428 A1 | 6/2024 | Kamiya | | |

OTHER PUBLICATIONS

International Search Report and Written Opinion dated May 27, 2025 for International Application No. PCT/US2025/013501, International Filing Date Jan. 29, 2025.

* cited by examiner

*Primary Examiner* — Zoheb S Imtiaz
(74) *Attorney, Agent, or Firm* — Jeremy J. Klobucar

(57) ABSTRACT

A thermal management system for an electric drive module configured to generate and transfer drive torque to a driveline for propulsion of an electric vehicle is provided. The system includes a motor housing, a pump, a first and second temperature sensor and a controller. The motor housing has an electric motor and a sump. The pump delivers fluid through a hydraulic circuit to the electric motor. The first temperature sensor senses a first temperature at the pump. The second temperature sensor senses a second temperature at the sump. The controller is configured to: determine an initial pump flow based on a heat losses associated with a speed and torque of the motor; command the pump to operate at an initial speed to satisfy the initial pump flow; compare at least one of the first and second temperatures to a threshold; command the pump to operate at a first modified speed.

9 Claims, 2 Drawing Sheets

SYSTEM AND METHOD FOR THERMAL AND LUBRICATION MANAGEMENT IN ELECTRIC DRIVE MODULE

FIELD

The present application generally relates to battery electric vehicles (BEVs) and, more particularly, to thermal and lubrication management systems for BEV electric drive modules.

BACKGROUND

Some battery electric vehicles (BEVs) include an electric drive module (EDM) for propulsion. EDMs have electric motors that are cooled by thermal systems to prevent overheating. However, in some examples such conventional thermal systems may insufficiently or inefficiently provide coolant pump flow required for cooling and/or lubricating each element in the system. For example, some coolant pumps are configured to provide constant flow rates to the EDM's, even when a reduced flow rate would be sufficient to cool the EDM. Insufficient cooling and/or lubricating may result in higher operating temperatures that can affect the overall motoring performance, reliability and efficiency of the machine. Further, constant operation of the coolant pump at unnecessarily high flow rates adversely draws power from the battery system of the BEV, ultimately reducing vehicle range. Accordingly, while such conventional thermal systems work well for their intended purpose, there exists an opportunity for improvement in the relevant art.

SUMMARY

According to one example aspect of the invention, a thermal management system for an electric drive module (EDM) configured to generate and transfer drive torque to a driveline for propulsion of an electric vehicle is provided. The system includes a motor housing, a pump, a first and second temperature sensor and a controller. The motor housing has an electric motor and a sump. The pump delivers fluid through a hydraulic circuit to the electric motor. The first temperature sensor senses a first temperature at the pump. The second temperature sensor senses a second temperature at the sump. The controller is configured to: determine an initial pump flow based on a heat losses associated with a speed and torque of the electric motor; command the pump to operate at an initial speed to satisfy the initial pump flow; compare at least one of the first and second temperatures to a threshold; command the pump to operate at a first modified speed, distinct from the initial speed based on the comparing.

In addition to the foregoing, commanding the pump to operate at a modified speed further comprises: determining whether at least one of the first and second temperatures is less than a threshold and reducing the speed of the pump based on a determination that at least one of the first and second temperatures is less than the threshold.

In addition to the foregoing, commanding the pump to operate at a modified speed further comprises: determining whether at least one of the first and second temperatures is greater than a threshold and increasing the speed of the pump based on a determination that at least one of the first and second temperatures is greater than the threshold.

In addition to the foregoing, the thermal management system further includes a poppet valve disposed in the fluid circuit and selectively communicating fluid from the fluid circuit to at least one shower head on the motor housing.

In addition to the foregoing, the controller is further configured to determine whether a power loss of the system exceeds a power loss threshold; and operate the pump at a second modified speed, higher than the initial speed, wherein the second modified speed increases a pressure in the hydraulic circuit thereby opening the poppet valve.

In other features, the controller is configured to determine the initial pump flow based on (i) a gearbox heat loss lookup table based on the speed and torque of the motor; and (ii) a motor heat loss lookup table based on the speed and torque of the motor.

According to another example aspect of the invention, a method of operating a thermal management system for an electric drive module (EDM) is provided. The EDM is configured to generate and transfer drive torque to a driveline for propulsion of an electric vehicle, the EDM having a motor housing having an electric motor and a sump; a pump that delivers coolant through a hydraulic circuit to the electric motor; a first temperature sensor that senses a first temperature at the pump; and a second temperature sensor that senses a second temperature at the sump. The method includes determining, at a controller, an initial pump flow based on a heat losses associated with a speed and torque of the motor; commanding, at the controller, the pump to operate at an initial speed to satisfy the initial pump flow; comparing, at the controller, at least one of the first and second temperatures to a threshold; and commanding, at the controller, the pump to operate at a first modified speed, distinct from the initial speed based on the comparing.

In other features, commanding the pump to operate at a modified speed further comprises determining whether at least one of the first and second temperatures is less than a threshold; and reducing the speed of the pump based on a determination that at least one of the first and second temperatures is less than the threshold.

In other features, commanding the pump to operate at a modified speed further comprises determining whether at least one of the first and second temperatures is greater than a threshold; and increasing the speed of the pump based on a determination that at least one of the first and second temperatures is greater than the threshold.

In further features, the method includes selectively communicating fluid from the fluid circuit to at least one shower head on the motor housing using a poppet valve disposed in the fluid circuit.

In addition to the foregoing, the method includes determining whether a power loss of the system exceeds a power loss threshold; and operating the pump at a second modified speed, higher than the initial speed, wherein the second modified speed increases a pressure in the hydraulic circuit thereby opening the poppet valve.

In other features, the method includes determining the initial pump flow based on (i) a gearbox heat loss lookup table based on the speed and torque of the motor; and (ii) a motor heat loss lookup table based on the speed and torque of the motor.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As identified above, an electric drive module (EDM) on an electric vehicle requires sufficient lubrication and cooling. In some conventional thermal systems used with an EDM inefficiently provide coolant pump flow required for cooling and/or lubricating each element in the system. In this regard, inefficient systems can result in excessive power consumption of the pump. Prior art solutions operate the pump at constant flow to provide sufficient cooling and lubrication for worst-case conditions. In some inefficient systems such as when the EDM is operating at low power output, the pump is still delivering an amount of oil that would be needed for the EDM operating at high power output. In other words, more oil is delivered by the pump than is needed resulting in unnecessary power consumption and higher drag losses at the bearings in the EDM. When too much oil flows through the EDM, the oil does not have the opportunity to heat up resulting in increased bearing and gear drag. A constant flow pump can also consume more battery energy resulting in a reduction in reduced range.

Described herein are systems and methods for thermal management of an EDM for an electric vehicle. The EDM systems and methods described herein provide a cooling and lubrication solution for electric motors housed within the EDM (or a hybrid transmission). A pump supplies coolant (e.g., oil) to various components of the EDM. The thermal management system improves cooling effectiveness for electric motor cooling architectures that employ oil spray from shower heads incorporated in the housing to cool the components of the motor including the end-windings. The control method implemented herein determines an optimal oil flow for efficient thermal balancing of the EDM. The controller commands the pump to operate at variable speeds based on the optimal oil flow determination.

Figure 1:
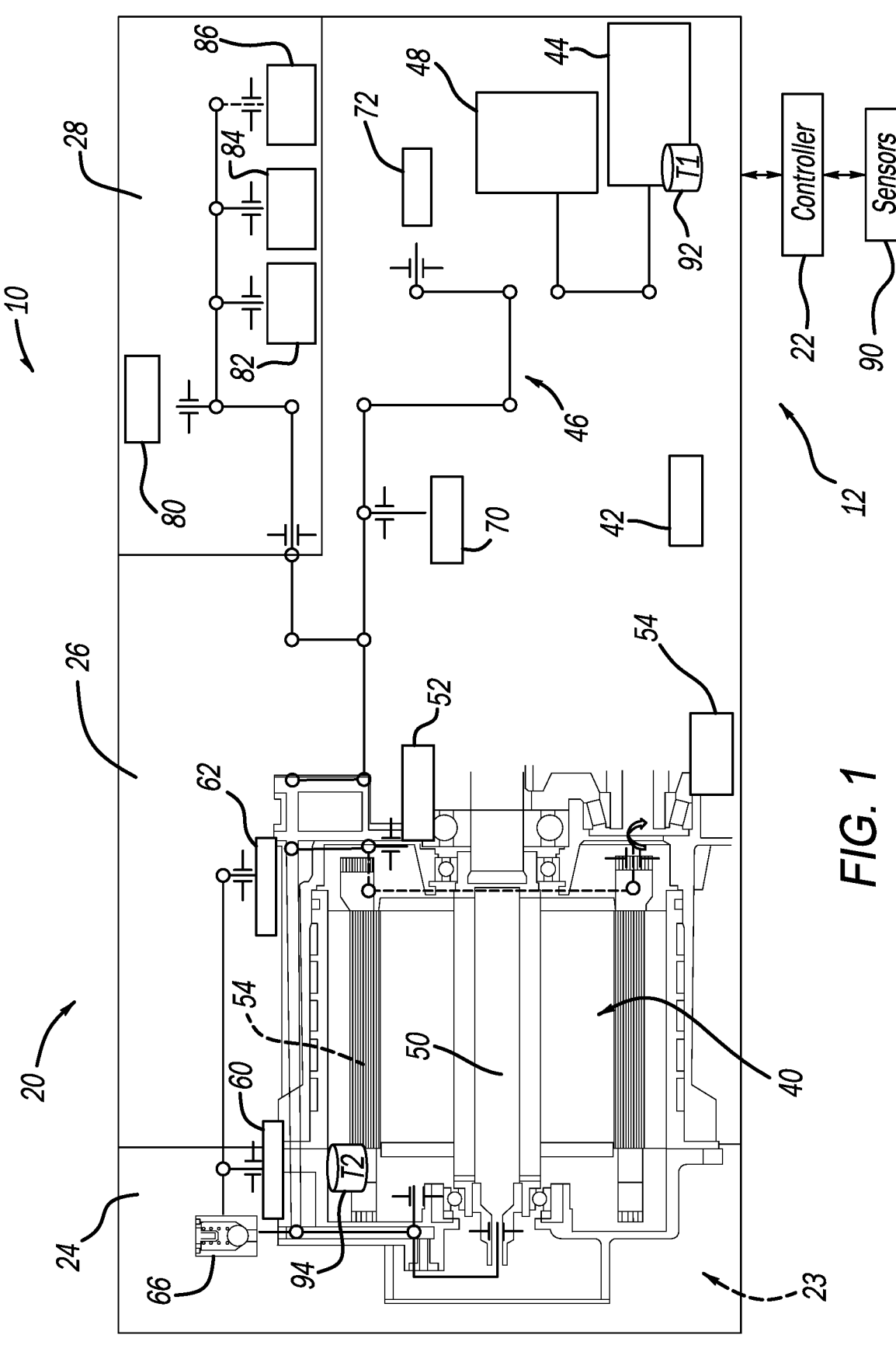
FIG. 1 is a schematic illustration of an example electric drive module for an electric vehicle (BEV) with a thermal management system in accordance with the principles of the present application.

Referring now to FIG. 1, a schematic illustration of a BEV 10 (hereinafter, "vehicle 10") having an example thermal management system 12 according to the principles of the present application is illustrated. The thermal management system 12 generally comprises an electric drive module (EDM) 20 that communicates with a controller 22. The EDM 20 is configured to generate and transfer drive torque through a gearbox or transmission 23 to a driveline (not shown) for vehicle propulsion.

In the example embodiment, the EDM 20 generally comprises a motor cover 24, a motor housing 26 and a gear cover 28. A motor 40 is generally disposed in the motor housing 26. A sump 42 is arranged in the motor hosing and is configured to receive the coolant after it has flowed across the features of the EDM. The pump 44 draws coolant from the sump 42 to repeat the cooling circuit as needed. The EDM includes a pump 44 that delivers coolant (e.g., oil) through a coolant delivery circuit or manifold 46. A heat exchanger (WTOC) 48 is provided in the fluid circuit 46 generally near the pump 44 to provide a heating input or output to the coolant.

The motor 40 generally includes a rotor shaft 50 an input motor bearing 52, end windings 54, a first shower head 60, a second shower head 62 and a poppet valve 66. The first and second shower heads 60 and 62 can dispense coolant onto components (e.g., rotor, stator, windings etc.) of the motor 40. As will be described herein, the poppet valve 66 opens and closes based upon a pressure within the fluid circuit 46. In some implementations, such as when the pump 44 is operating at high flow rate to cool the EDM operating at elevated operating RPM's, the poppet valve 66 is forced open allowing fluid to be delivered to the shower heads 60, 62 to deliver coolant toward the end windings of the motor 40 to increase the effectiveness of cooling the motor 40.

A cool motor is desirable as it can run at higher power density. In examples, the controller 22 can determine that power losses are too high in the system due to the pump 44 operating at an elevated rate. The controller 22 can reduce the rate of flow from the pump 44 therefore reducing the pressure in the circuit 46. A reduction in pressure in the circuit 46 causes the poppet valve 66 to close (as it is not necessary to deliver coolant through the shower heads 60, 62) to save unnecessary power consumption of the pump 44.

A differential 70 is incorporated within the motor housing 26. The gear cover 28 can include a front differential bearing 80, a front transfer bearing 82, a front input bearing 84 and an optional gear spray 86. As shown, the pump 44 is configured to deliver coolant to various components of the EDM 20 through the manifold 46.

The controller 22 receives inputs from sensors 90. The sensors 90 can provide inputs that the controller 22 can use to determine a speed and a torque of the motor 40. Using the speed and torque of the motor 40, the controller 22 can determine gearbox 23 losses and motor 40 losses. In examples, the controller 22 determines gearbox 23 losses and motor 40 losses based on lookup tables or by Physics based models of the motor, gears, and bearings or combinations thereof. A first lookup table can provide a gearbox loss based on a motor speed (RPM) and a motor torque (Nm). Motor speed and/or motor torque can be sensed such as by sensors 90. In implementations, the sensors 90 can further include an oil temperature sensor in the pump motor 92 that provides a real-time temperature of the oil in the pump 44 and a motor temperature sensor 94 that provides a real-time temperature of the motor 40. As discussed herein, these temperatures are used to modify flow rate of the pump 44.

In the example embodiment, the thermal management system 12 is configured to provide a fluid (e.g., oil) for lubrication and/or cooling to various components of the EDM 20 and generally includes the fluid circuit 46, the sump 42, the pump 44, the shower heads 60, 62, the poppet 66, the sensors 90 and the controller 22. In the example embodiment, the pump 44 is configured to supply the fluid through the fluid circuit 46 to the motor 40 and other components of the EDM (e.g., differential 70 and various bearings shown). The sump 42 is configured to act as a reservoir to receive and collect the used/heated fluid after lubricating/cooling the EDM components. The sump 42 can be configured as a dual sump system that has a main sump and a gearbox sump.

According to the present disclosure, the controller 22 commands the pump 44 to only pump an amount of fluid necessary to satisfactorily cool and lubricate the system. By way of example only, the pump 44 may be able to operate at 200 watts for delivering high flow rate of coolant (such as at 20 liters/minute) such as during high load conditions of the EDM 20. However, most operating conditions of the EDM 20 are low load conditions that do not require the high wattage and high flow rates. For example only, the pump 44 can be commanded to operate at a lower flow rate such as 4 liters/minute in lower load operating conditions of the EDM 20. Again, the wattage and flow rates are merely exemplary and other values may be used within the scope of the disclosure for operating the pump 44 at a reduced, and still adequate, flow rate. A reduced flow rate results in a reduced hydraulic pressure within the fluid circuit 26 reducing power consumption (for example from 200 watts to 12 watts). Power consumption of the pump 44 is minimized with the thermal management system 12 therefore dedicating more battery power for motor 40 to maximizing range of the vehicle 10.

Figure 2:
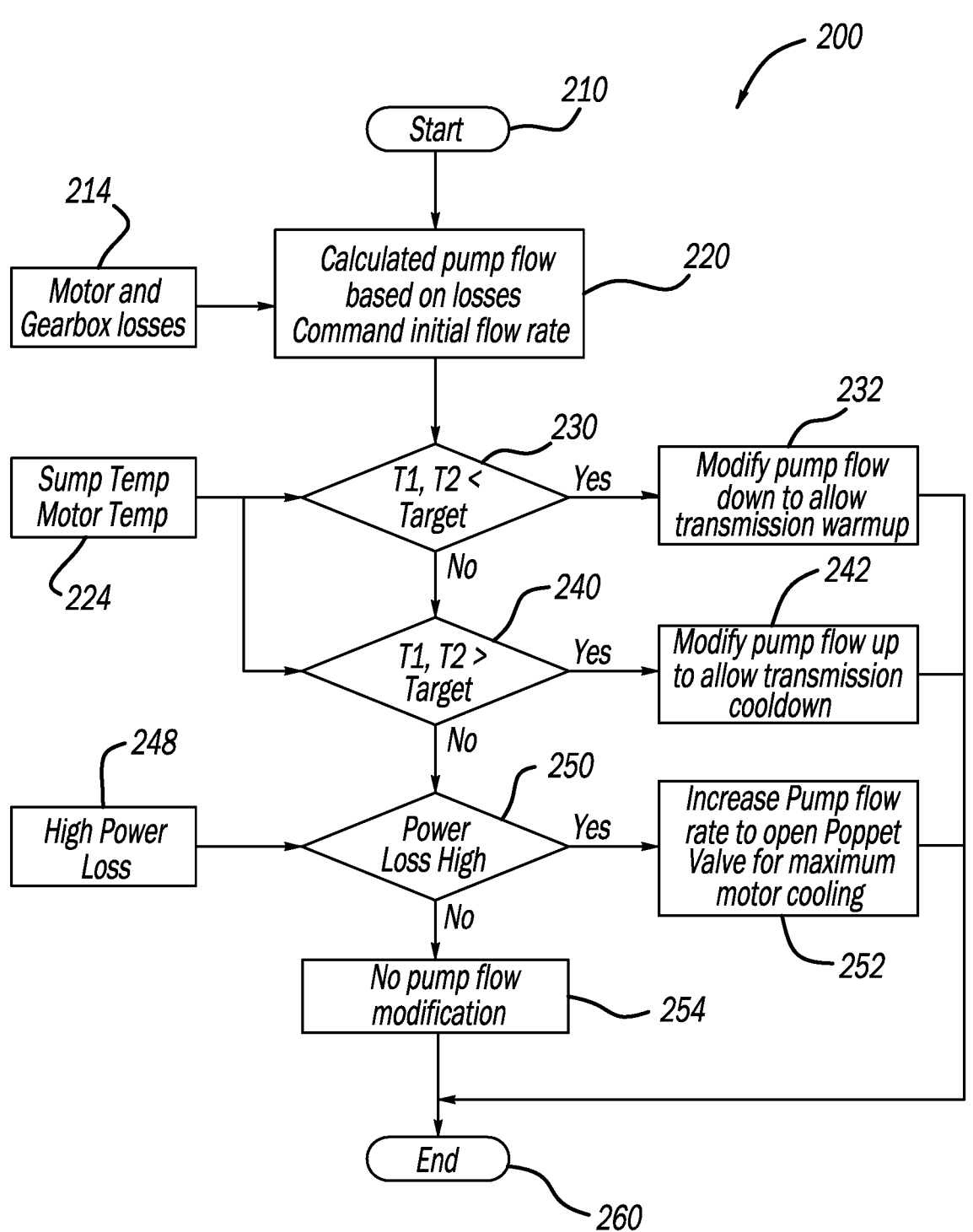
FIG. 2 is a logic flow diagram of a thermal management system according to principles of the present application.

With continued reference to FIG. 1 and additional reference to FIG. 2, an exemplary control method for implementing the thermal management system 12 according to principles of the present application will be described. The method begins at 210. At 220 control calculates pump flow necessary to remove heat generated by motor and gearbox losses. Control operates the pump 44 initially at the initial flow rate determined at 220. The pump flow is calculated based on the motor and gearbox losses 214 determined from the speed and torque of the motor 40. At 230, control determines whether the sump temp T1 (measured by the temperature sensor 94) and/or the motor temp T2 (measured by the temperature sensor 92), received at 224 are less than a target threshold. If yes, control modifies the flow of the pump 44 down at 232 to allow warmup of the transmission 23 and control ends at 260. As can be appreciated, warming up of the transmission 23 is desirable to increase the thermal capacity in the EDM 20 to reduce viscous losses and drag losses in the system.

If control determines that the sump temp T1 and/or the motor temp T2 are not less than a target threshold, control determines whether the sump temp T1 and/or the motor temp T2 are more than a target threshold at 240. If yes, control modifies the flow of the pump 44 up at 242 to allow cooldown of the transmission 23 and control ends at 260.

If control determines that the sump temp T1 and/or the motor temp T2 are not more than a target threshold at 240, control determines whether power loss of the pump 44 exceeds a threshold at 250. In examples, control receives a high power loss signal at 248. If control determines that the power loss of the pump 44 is high at 250, control increases flow rate of the pump 44 to open the poppet valve 66 for maximum cooling of the motor 40 and ends at 260. If control determines that the power loss of the pump 44 does not exceed a threshold at 250, control does not modify flow of the pump at 254. Control ends at 260. Control can also be configured to detect low fluid in the sump 42 and determine flow requirements for the differential 70. Control can modify the pump rate based on a detected low fluid in the sump 42. Similarly, control can modify the pump rate based on flow requirements determined for the differential.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A thermal management system for an electric drive module (EDM) configured to generate and transfer drive torque to a driveline for propulsion of an electric vehicle, the thermal management system comprising:

a motor housing having an electric motor and a sump;

a pump that delivers fluid through a hydraulic circuit to the electric motor;

a first temperature sensor that senses a first temperature at the pump;

a second temperature sensor that senses a second temperature at the sump;

a poppet valve disposed in the fluid circuit and selectively communicating fluid from the fluid circuit to at least one shower head on the motor housing;

a controller configured to:

determine an initial pump flow based on a heat losses associated with a speed and torque of the electric motor;

command the pump to operate at an initial speed to satisfy the initial pump flow;

compare at least one of the first and second temperatures to a threshold;

command the pump to operate at a first modified speed, distinct from the initial speed based on the comparing;

determine whether a power loss of the system exceeds a power loss threshold; and operate the pump at a second modified speed, higher than the initial speed, wherein the second modified speed increases a pressure in the hydraulic circuit thereby opening the poppet valve.

2. The thermal management system of claim 1, wherein commanding the pump to operate at a modified speed further comprises:

determining whether at least one of the first and second temperatures is less than a threshold and reducing the speed of the pump based on a determination that at least one of the first and second temperatures is less than the threshold.

3. The thermal management system of claim 2, wherein commanding the pump to operate at a modified speed further comprises:

determining whether at least one of the first and second temperatures is greater than a threshold and increasing the speed of the pump based on a determination that at least one of the first and second temperatures is greater than the threshold.

4. The thermal management system of claim 1, wherein the controller is configured to determine the initial pump flow based on (i) a gearbox heat loss lookup table based on the speed and torque of the electric motor; and (ii) a motor heat loss lookup table based on the speed and torque of the electric motor.

5. The thermal management system of claim 1, wherein the fluid comprises oil.

6. A method of operating a thermal management system for an electric drive module (EDM) configured to generate and transfer drive torque to a driveline for propulsion of an electric vehicle, the EDM having a motor housing having an electric motor and a sump; a pump that delivers fluid through a hydraulic circuit to the electric motor; a first temperature sensor that senses a first temperature at the pump; a second temperature sensor that senses a second temperature at the sump; and a poppet valve disposed in the fluid circuit, the method comprising;

determining, at a controller, an initial pump flow based on a heat losses associated with a speed and torque of the electric motor;

commanding, at the controller, the pump to operate at an initial speed to satisfy the initial pump flow;

comparing, at the controller, at least one of the first and second temperatures to a threshold;

commanding, at the controller, the pump to operate at a first modified speed, distinct from the initial speed based on the comparing;

selectively communicating fluid from the fluid circuit to at least one shower head on the motor housing using the poppet valve;

determining whether a power loss of the system exceeds a power loss threshold; and operating the pump at a second modified speed, higher than the initial speed, wherein the second modified speed increases a pressure in the hydraulic circuit thereby opening the poppet valve.

7. The method of claim 6, wherein commanding the pump to operate at a modified speed further comprises:

determining whether at least one of the first and second temperatures is less than a threshold; and reducing the speed of the pump based on a determination that at least one of the first and second temperatures is less than the threshold.

8. The method of claim 7, wherein commanding the pump to operate at a modified speed further comprises:

determining whether at least one of the first and second temperatures is greater than a threshold; and increasing the speed of the pump based on a determination that at least one of the first and second temperatures is greater than the threshold.

9. The method of claim 6, further comprising:

determining the initial pump flow based on (i) a gearbox heat loss lookup table based on the speed and torque of the electric motor; and (ii) a motor heat loss lookup table based on the speed and torque of the electric motor.

* * * * *